(12) United States Patent
Sezan et al.

(10) Patent No.: US 7,536,706 B1
(45) Date of Patent: May 19, 2009

(54) INFORMATION ENHANCED AUDIO VIDEO ENCODING SYSTEM

(75) Inventors: M. Ibrahim Sezan, Camas, WA (US);
Richard Qian, Vancouver, WA (US);
George Borden, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 677 days.

(21) Appl. No.: 09/280,421

(22) Filed: Mar. 29, 1999

Related U.S. Application Data

(60) Provisional application No. 60/097,738, filed on Aug. 24, 1998.

(51) Int. Cl.
*G06T 1/00* (2006.01)
*G06F 3/00* (2006.01)
*H04N 5/50* (2006.01)

(52) U.S. Cl. .................. 725/113; 725/112; 725/135

(58) Field of Classification Search .......... 725/135–136
See application file for complete search history.

(56) References Cited

U.S. PATENT DOCUMENTS

| | | | |
|---|---|---|---|
| 4,719,509 A | 1/1988 | Sakamoto |
| 5,019,903 A | 5/1991 | Dougall et al. |
| 5,095,354 A | 3/1992 | Sokawa et al. |
| 5,226,114 A | 7/1993 | Martinez et al. |
| 5,233,421 A | 8/1993 | Chrisopher |
| 5,307,164 A | 4/1994 | Dong-Il |
| 5,327,529 A | 7/1994 | Fults et al. |
| 5,329,314 A | 7/1994 | Correa et al. |
| 5,410,326 A | 4/1995 | Goldstein |
| 5,428,397 A | 6/1995 | Lee et al. |
| 5,430,490 A | 7/1995 | Rim |

(Continued)

FOREIGN PATENT DOCUMENTS

EP 0790736 A1 8/1997

(Continued)

OTHER PUBLICATIONS

Murray, James D. and VanRyper, William, *Encyclopedia of Graphics File Formats, Second Edition*, 1996, "JPEG File Interchange Format," pp. 510-515.

(Continued)

*Primary Examiner*—Christopher Kelley
*Assistant Examiner*—Reuben M Brown
(74) *Attorney, Agent, or Firm*—Chernoff, Vilhauer, McClung & Stenzel

(57) ABSTRACT

A system includes additional information together with a video stream, where the additional information is related to at least one of the frames. Preferably the additional information is related to an object within the frame. A receiver receives the video and additional information and decodes the video in the same manner independently of whether the additional information is provided. The additional information is selectively presented to a viewer at approximately the time of receiving the frames. The system may also present information to a viewer from a unitary file containing an image and additional information associated with the image. A selection mechanism permits the selection of objects in the image for which the additional information is related thereto. A presentation mechanism provides the additional information to a viewer in response to selecting the object.

29 Claims, 9 Drawing Sheets

U.S. PATENT DOCUMENTS

| | | | |
|---|---|---|---|
| 5,475,438 A | 12/1995 | Bretl | |
| 5,493,338 A | 2/1996 | Hong | |
| 5,517,247 A | 5/1996 | Correa et al. | |
| 5,519,451 A | 5/1996 | Clatanoff et al. | |
| 5,532,751 A | 7/1996 | Lui | |
| 5,539,471 A | 7/1996 | Myhrvold et al. | |
| 5,539,871 A | 7/1996 | Gibson | |
| 5,541,662 A | 7/1996 | Adams et al. | |
| 5,550,592 A | 8/1996 | Markandey et al. | |
| 5,553,221 A | 9/1996 | Reimer et al. | |
| 5,559,949 A | 9/1996 | Reimer et al. | |
| 5,586,235 A | 12/1996 | Kauffman | |
| 5,594,504 A | 1/1997 | Ebrahimi | |
| 5,596,705 A | 1/1997 | Reimer et al. | |
| 5,600,775 A | 2/1997 | King et al. | |
| 5,602,654 A | 2/1997 | Patti et al. | |
| 5,611,036 A | 3/1997 | Berend et al. | |
| 5,655,117 A | 8/1997 | Goldberg et al. | |
| 5,706,049 A | 1/1998 | Moghadam | |
| 5,708,845 A * | 1/1998 | Wistendahl et al. | 715/500.1 |
| 5,727,141 A * | 3/1998 | Hoddie et al. | 345/475 |
| 5,754,710 A | 5/1998 | Sekine et al. | |
| 5,818,441 A * | 10/1998 | Throckmorton et al. | 725/112 |
| 5,832,495 A | 11/1998 | Gustman et al. | |
| 5,838,385 A | 11/1998 | Reder et al. | |
| 5,862,260 A | 1/1999 | Rhoads | |
| 5,886,745 A | 3/1999 | Muraji et al. | |
| 5,918,012 A * | 6/1999 | Astiz et al. | 709/217 |
| 5,929,849 A * | 7/1999 | Kikinis | 725/113 |
| 5,929,918 A | 7/1999 | Marques-Pereira | |
| 5,936,676 A | 8/1999 | Ledinh et al. | |
| 5,946,419 A | 8/1999 | Chen et al. | |
| 5,970,179 A | 10/1999 | Ito | |
| 6,040,868 A | 3/2000 | Jun | |
| 6,256,785 B1 * | 7/2001 | Klappert et al. | 725/136 |
| 6,324,694 B1 * | 11/2001 | Watts et al. | 725/32 |
| 6,715,037 B2 * | 3/2004 | Malcolm | 711/119 |
| 6,724,921 B2 * | 4/2004 | Yamaguchi | 382/118 |

FOREIGN PATENT DOCUMENTS

| | | |
|---|---|---|
| EP | 0 596 823 | 7/2000 |
| WO | WO 97/41690 | 11/1997 |
| WO | WO 98/16062 | 4/1998 |

OTHER PUBLICATIONS

Murray, James D. and VanRyper, William, *Encyclopedia of Graphics File Formats, Second Edition*, 1996, "SPIFF," pp. 822-837.

ITU-T Recommendation T.84; ISO/IEC IS 10918-3, *Digital Compression and Coding of Continuous-Tone still images—Extensions*. Made available via ISO/IED SC29 WGI.

* cited by examiner

INFORMATION ENHANCED AUDIO VIDEO ENCODING SYSTEM

CROSS-REFERENCE TO RELATED APPLICATIONS

This application claims the benefit of U.S. Provisional Application No. 60/097,738, filed Aug. 24, 1998.

BACKGROUND OF THE INVENTION

The present invention relates to an improved audio, video, and/or image system with enhanced functionality.

In the current information age viewers are bombarded by vast amounts of video information being presented to them. The video information may be presented to the viewer using many devices, such as for example, broadcast television, cable television, satellite broadcasts, streaming video on computer networks such as the World Wide Web, and video from storage devices such as compact discs, digital video discs, laser discs, and hard drives. People generally view video content in a passive manner with the interaction limited to interactivity typically found on a VCR. Depending on the source of the video and the viewing device, the viewer may have the ability to fast forward, fast reverse, stop, pause, and mute the video. Unfortunately, it is difficult for the viewer to locate specific information within a video or summarize a video without the time consuming task of viewing large portions of the video.

Existing digital libraries may incorporate techniques that attempt to process the video to create a summary of its content. However, the existing digital library techniques process selected frames as a whole in order to characterize the content of the video. For example, color histograms of selected frames may be used to describe the content of the frames. The resulting color histograms may be further summarized to provide a global measure of the entire video. The resulting information is associated with the respective video as a description thereof. Unfortunately, it is difficult to identify and characterize objects within the image, such as Jeff playing with a blue beach ball on the beach.

BRIEF SUMMARY OF THE INVENTION

The present invention overcomes the aforementioned drawbacks of the prior art by providing in a first aspect a system that includes additional information together with a video stream, where the additional information is related to at least one of the frames. Preferably the additional information is related to an object within the frame. A receiver receives the video and additional information and decodes the video in the same manner independently of whether the additional information is provided. The additional information is selectively presented to a viewer at approximately the time of receiving the frames.

In another aspect of the present invention a system for presenting information includes a unitary file containing an image and additional information associated with the image. A selection mechanism permits the selection of objects in the image for which the additional information is related thereto. A presentation mechanism provides the additional information to a viewer in response to selecting the object.

DETAILED DESCRIPTION OF THE PREFERRED EMBODIMENT

The present inventors came to the realization that the presently accepted passive viewing technique for video may be enhanced by incorporating additional information together with the video stream. The additional information may include for example, a description of the content of portions of the video, links within the video to information apart from the video itself, links within the video to other portions of the video, software for computer programs, commands for other related interactivity, object indexes, textual descriptions, voice annotations, image features, object links, URL links, and Java applets. Other information may likewise be included as desired. However, incorporating the additional information within the video stream would in most instances require a new specification to be developed. For example, the MPEG and MPEG-2 standards do not provide for the inclusion of additional information therein other than what is specified in the standard. The result of modifying such a video encoding technique would result in each viewer desiring to view the modified video being required to obtain a specialized viewer, at additional expense.

The present inventors came to the further realization that each video standard that includes the capability of incorporating additional information therein, the particular technique used to incorporate the additional information is dependant on the particular video standard. Unfortunately, if a set of information is developed that relates to a particular video, then for each video standard a different technique is necessary to incorporate the additional information with the video. With the large number of different video standards available it would be burdensome to develop techniques for incorporating the additional information with each video standard.

Figure 1:
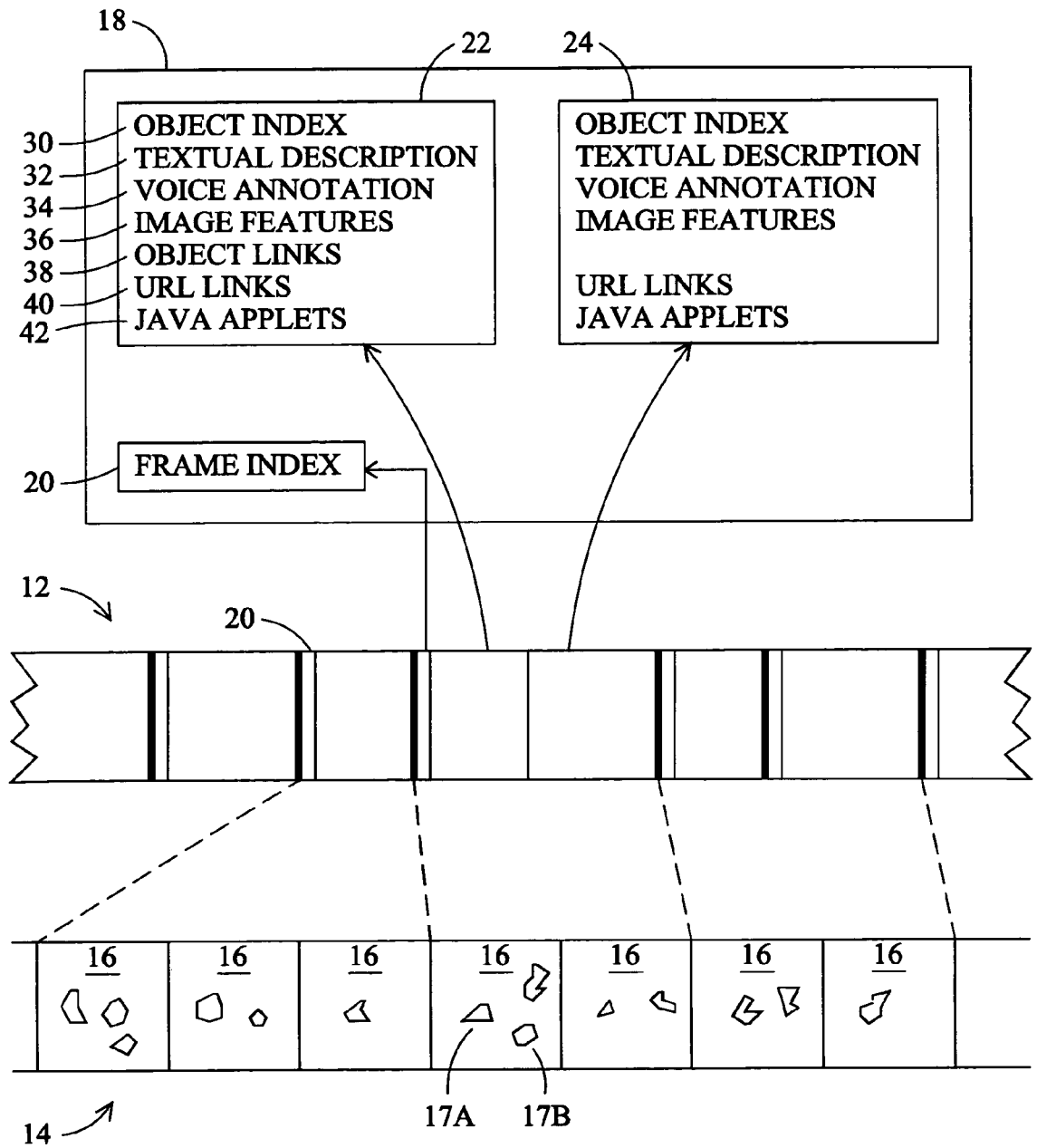
FIG. 1 is a depiction of a video and a descriptive stream together with data stored therein.

In view of the large number of video standards and the difficulty of incorporating such additional information therein the present inventors came to the further realization that a generally format independent technique of referencing the additional information is desirable. In addition, a generally format independent format is more easily repurposed for different types of video formats. Referring to FIG. 1, a description stream 12 containing the additional information is created as a companion for a video sequence 14. The video sequence 14 is composed of a plurality of sequential frames 16. The video may have any suitable format, such as for example analog or digital, interlaced or progressive, and encoded or not encoded. Each frame 16 may include one or more objects of interest 17a and 17b. Portions of the description stream 12 may be associated with any number of frames of the video sequence 14, such as a single frame, a group of sequential frames, a group of non-sequential frames, or the entire video sequence 14, as desired. In the event that a portion of the descriptive stream 12 is associated with a sequential number of frames, that portion of the descriptive stream may be thought of as having a "lifespan."

The descriptive stream contains additional information about objects, such as 17a and 17b, appearing within one or more of the video frames 16. The descriptive stream 12 includes data blocks 18 where each block is associated with one or more frames 16, and preferably particular objects 17a, 17b within one or more frames 16. Alternatively, the data blocks 18 may be associated with frames 16 as a whole. Each data block 18 preferably includes a frame index 20 at the beginning of the data block to provide convenient synchronization with the associated frame 16. The frame index 20 includes data which identifies the particular frame the following data block is associated with. If the descriptive stream 12 and the video sequence 14 are sufficiently correlated in some manner, such as in time, then the frame index 20 may be unnecessary. In the case of broadcast video, preferably the video sequence 14 and the description stream 12 are time correlated. In the case of computer or digital based broadcasts, the video sequence 14 and the descriptive stream 12 may be transmitted at different time intervals. For example, a large portion of the descriptive stream 12 may be transmitted, and then the associated video sequence 14 may be transmitted.

The frames indexes 20 are used to synchronize, or otherwise associate, the data blocks 18 of the descriptive stream 12 with the video sequence 14. Each data block 18 may be further divided into a number of sub-blocks 22, 24, containing what are referred to herein as descriptors. Each sub-block 22, 24 corresponds to an individual object of interest within the frame 16. For example, sub-block 22 may correspond to object 17a and sub-block 24 may correspond to object 17b. Alternatively, each of the sub-blocks may correspond to multiple objects of interest. Also, there may be objects in the image that are not defined as objects of interest, and which therefore, would not have a sub-block associated therewith. Sub-blocks 22, 24 include a plurality of data fields therein containing the additional information, including but not limited to, an object index field 30, a textual description field 32, a voice annotation field 34, an image feature field 36, an object links field 38, a URL links field 40, and a Java applets field 42. Additional information may be included such as copyright and other intellectual property rights. Some notices, such as copyrights, may be encoded and rendered invisible to standard display equipment so that the notices are not easily modified.

When a viewer is viewing the video sequence 14, a visible or audible indicia is preferably presented to the viewer to indicate that a descriptive stream is associated with a particular sequence of video frames. The viewer may access the additional information using any suitable interface. The additional information is preferably presented to the user using a picture-in-a-picture (PIP) box on the display while the video sequence 14 continues to be presented. The video sequence 14 may be stopped during access of the additional information, if desired. An alternative technique for presenting the additional information to the viewer is to provide the additional information on a display incorporated into unidirectional or bidirectional remote control unit of the display device or VCR. This allows access to the additional information at a location proximate the viewer. In the case of broadcast video, such as network television broadcasts, if the viewer does not take appropriate actions to reveal the associated information the descriptive stream "dies," and may not, unless stored in a buffer, be revived. In the case that the descriptive stream is part of a video tape, a video disc, or other suitable media, the viewer can "rewind" the video and access an earlier portion of the descriptive stream and display the additional information.

The object index field 30 indexes one or more individual objects 17a, 17b within the frame 16. In the case of indexing the frame as a whole, the object index field 30 indexes the frame. The object index field 30 preferably contains a geometrical definition of the object. When a viewer pauses or otherwise indicates a desire to view the additional information for a particular frame, the system process the object index fields 30 corresponding to that frame, locates the corresponding objects 17a, 17b within the frame, and identifies the corresponding objects in some manner for the viewer such as highlighting them on the display or providing icons. The identified objects are those objects of the frame that have associated information related thereto. If the user selects an identified object, then the system provides the additional information from the corresponding sub-block, preferably with a pop-up menu, to the viewer.

The textual description field 32 preferably includes textual based information related to the object. The textual description field 32 may be similar in nature to traditional closed captioning, but instead is related to particular objects within the frame. The textual description field 32 may be used as the basis of a keyword-based search for relevant video segments. A content-based video search program may search through the textual description fields 32 of the description stream 12 to identify relevant portions of the video sequence(s) 14. With the textual description fields 32 normally related to individual objects within the frames 16 of the video sequence 12, the content-based video search provides actual object-oriented search capability.

The voice annotation field 34 preferably stores further audio based information regarding the object (or frame), preferably in natural speech. The voice annotation field 34 may include any audio information related to the associated object(s) (or frame(s)).

The image features field 36 is preferably used to store further information about the characteristics of the object (or frame), such as in terms of its texture, shape, dominant color, motion model describing its motion with respect to a certain reference frame. Image features based on objects within the frames of a video sequence may be particularly useful for content-based video image indexing and retrieval for digital libraries.

The object links field 38 is preferably used to store links to other video objects or frames in the same or different video sequence or image. Object links may be useful for video summarization, and object and/or event tracking.

Figure 2:
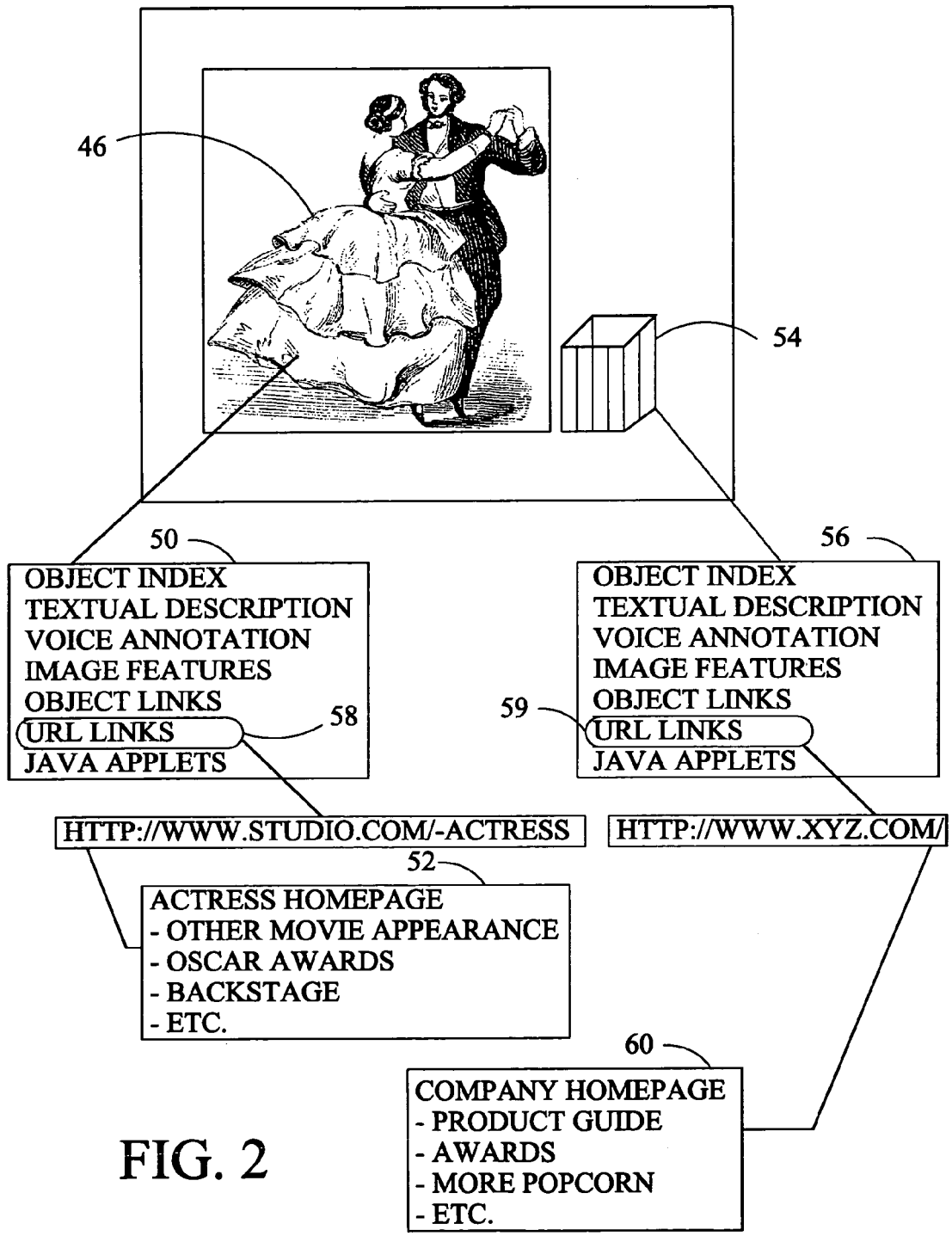
FIG. 2 is a video image with associated information in accordance with FIG. 1.

Referring also to FIG. 2, the URL links field 40 preferably contains addresses and/or links to external Web pages and/or other objects related to the object that are accessible though an electronic link, such as a computer network. For an object of interest in the scene, such as person 46, the URL link 58 in a sub-block 50 may point to a person's homepage address 52. Any symbol, icon, or portion of the scene may be linked to an external data source, such as a Web site which contains the related information. Companies may also desire to link products 54 shown in the video sequence, through the URL 58 of a sub-block 56, to an external data source, such as their Web site 60. This provides the potential for customers to learn more about particular products, increases advertising, and may increase sales of the products. The URL links field may also be used to automatically import data and other information from a data source external to the video sequence 14 and the description stream 12 for incorporation with the video sequence 14. In this manner, the video sequence 14 and the description stream 12 may be automatically updated with information from a source external to the video sequence 14 and the description stream 12. The information may be used in any suitable manner, such as overlying on the display, added to the video sequence, or update the contents of the information fields.

The Java Applets field 42 is preferably used to store Java code to perform more advanced functions related to the respective object(s). For example, a Java applet may be embedded to enable online ordering for a product shown in the video. Also, Java code may be included to implement sophisticated similarity measures to empower advanced content-based video search in digital libraries. Alternatively, any other programming language or coding technique may be used.

In the case of digital video, the cassettes used for recording in such systems may include a memory, such as solid state memory, which serves as a storage location for additional information. The memory for many such devices is referred to as memory-in-cassette (MIC). Where the video sequence is stored on a digital video cassette, the descriptive stream may be stored in the MIC, or on the video tape. In general, the descriptive stream may be stored along with the video or image contents on the same media. The descriptive stream is maintained separate from the video or image contents so that the video or image decoder does not have to also decode the descriptive stream encoded within the video stream, which is undesirable as previously discussed.

Figure 3:
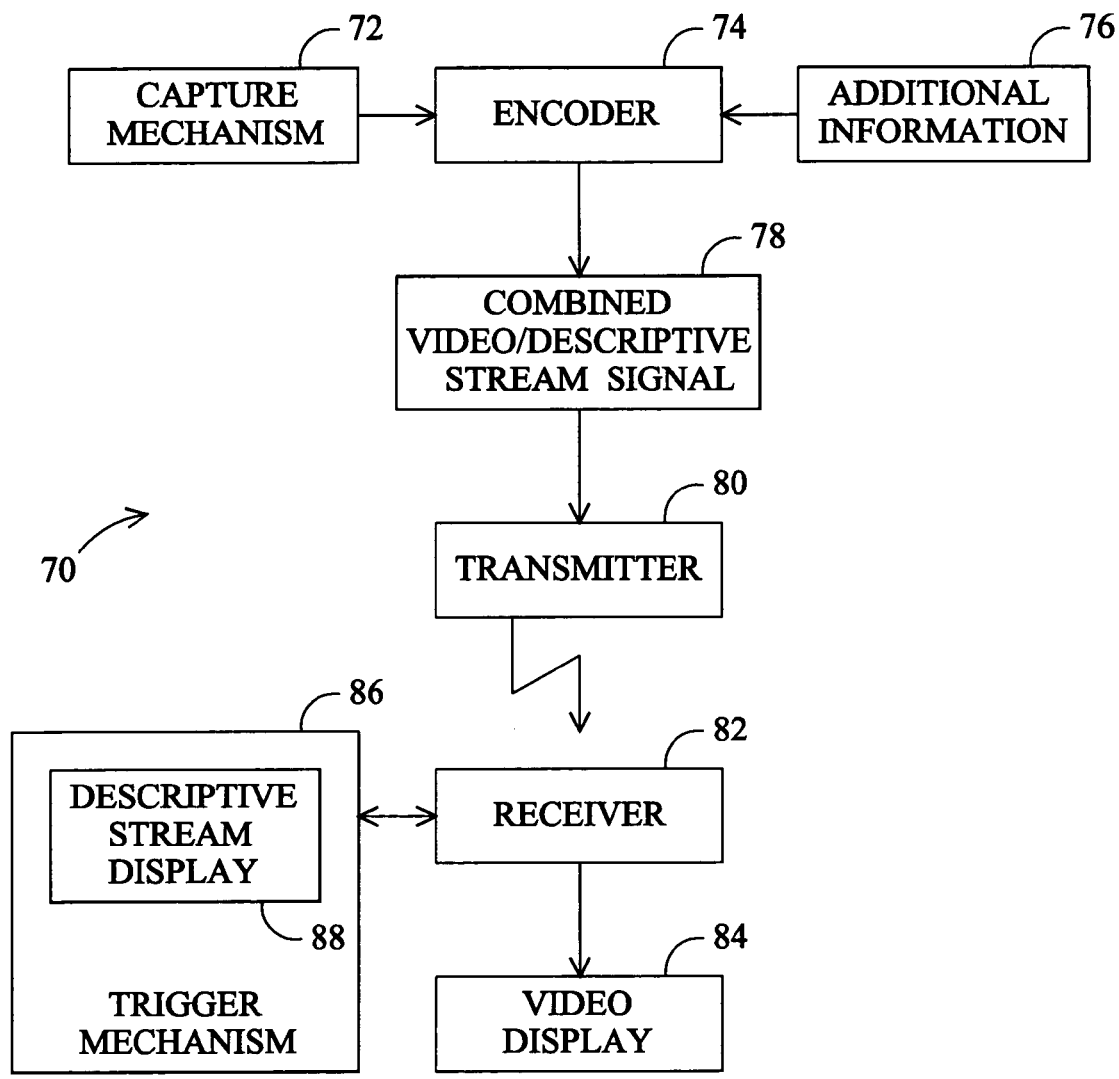
FIG. 3 is a system for the video and descriptive stream of FIG. 1.

Referring to FIG. 3, a system 70 generally applicable for a television broadcast system is shown. The system 70 includes a capture mechanism 72, which may be a video camera, a computer capable of generating a video signal, or any other mechanism that is capable of generating and/or providing a video signal. The video signal is provided to an encoder 74, which also receives appropriate companion signals for the various types of additional information 76 from which will form the descriptive stream. The encoder 74 generates a combined video stream and descriptive stream signal 78. The combined signal 78 is transmitted by a transmitter 80, which may be a broadcast transmitter, a hard-wire system, or a combination thereof. The combined signal 78 is received by a receiver 82, which separates the two signals and decodes each of the signals for display on a video display 84.

A trigger mechanism 86 is provided to cause the receiver 82 to decode and display the additional information contained within the descriptive stream in an appropriate manner. A decoder may be provided with the receiver 72 for decoding the embedded descriptive stream. The descriptive stream may be displayed in any suitable location or format such as a picture-in-picture (PIP) format on the video display 86, or a separate descriptive stream display 88. The separate descriptive stream display may be co-located with the trigger mechanism 86, which may take the form of a remote control mechanism for the receiver. Some form of indicia may be provided, such as a visible indicia on the video display or as an audible tone, to indicate that a descriptive stream is present in the video sequence.

Activating the trigger mechanism 86 when a descriptive stream is present will result in those objects which have descriptive streams associated therewith being highlighted, or otherwise marked, so that the user may select additional information about the object(s). In the case of a separate descriptive screen display, the selection options for the information is displayed in the descriptive stream display, and the device is manipulated to permit the user to select the additional information. The information may be displayed immediately, or may be stored for future reference. Of particular importance for this embodiment is to allow the video display to continue uninterrupted so that others watching the display will not be compelled to remove the remote control from the possession of the user who is seeking additional information.

In the event that the system is used with an audio and/or video library on a computer system, the capture mechanism, transmitter, and receiver may not be required, as the video or image will have already been captured and stored in a library. The library typically resides on magnetic or optical media which is hard-wired to the display. In this embodiment, a decoder to decode the descriptive stream may be located in the computer system or in the display. The trigger mechanism may include several other selection devices, such as a mouse or other pointing device, and incorporated into a keyboard with dedicated keys or by the assignment of a key sequence. The descriptive stream display will likely take the form of a window on the video display or a display on a remote.

Television stations may utilize the teachings described herein to increase the functionality of broadcasting programs. Television stations may transmit descriptive streams together with regular television signals so that viewers may receive both the television signals and the description streams to provide the advanced functions described herein. The technique for broadcast TV is similar to that of sending out closed caption text along with regular TV signals. Broadcasters have the flexibility of choosing to send or not to send the descriptive streams for their programs. If a receiving TV set has the capability of receiving and decoding the descriptive streams, then the viewer may activate the advanced functions, as desired, in a manner similar to the viewer selecting or activating, as desired, to view closed captioned text. If the viewer activates the advanced functions, the viewer, for example, may read text about someone or something in the programs, listen to voice annotations, access related Web site(s) if the TV set is Web enabled, or perform other tasks such as online ordering or gaming by executing embedded Java applets.

The descriptive stream for a video sequence may be obtained using a variety of mechanisms. The descriptive stream may be constructed manually using an interactive method. An operator may explicitly select to index certain objects in the video and associate some corresponding additional information. Another example is that the descriptive stream may be constructed automatically using any video analysis tools, especially those developed for the Moving Pictures Experts Group Standard No. 7 (MPEG-7).

Camcorders, VCRs, and DVD recorders, and other electronic devices may be used to create and store descriptive streams while recording and editing. Such devices may include a user interface to allow a user to manually locate and identify desired objects in the video, index the objects, and record corresponding information in the descriptive stream(s). For example, a user may locate an object within a frame by specifying a rectangular region (or polygonal region) which contains the object. The user may then enter text in the textual description field, record speech into the voice annotation field, and associate Web page addresses into the URL links field. The user may associate the additional information with additional objects in the same frame, additional objects in other frames, and other frames, as desired. The descriptions for selected objects may also be used as their audio and/or visual tags.

If a descriptive stream is recorded along with a video sequence, as described above, the video can be viewed later and support all the functions.

For digital libraries, the system may be applied to video sequences or images originally stored in any common format, such as RGB, D1, MPEG, MPEG-2, or MPEG-4. If a video sequence is stored in MPEG-4 format, the location information of the objects in the video may be extracted automatically. This alleviates the burden of manually locating the objects. Further, information may be associated with each extracted object within a frame and propagated into other sequential or nonsequential frames, if so selected. When a video sequence or image is stored in a non-object-based format, the mechanism described herein may be used to construct descriptive streams. This enables a video sequence or image stored in one format to be viewed and manipulated in a different format, and to have the description and linking features of the invention to be applied thereto.

The descriptive streams facilitate content-based video/image indexing and retrieval. A search engine may find relevant video contents at the object level, by matching relevant keywords against the text stored in the textual description fields in the descriptive streams. The search engine may also choose to analyze the voice annotations, match the image features, and/or look up the linked Web pages for additional information. The embedded Java applets may implement more sophisticated similarity measures to further enhance content-based video/image indexing and retrieval.

Images are traditionally self contained in a single file and displayed, as desired. For example, HTML files are frequently employed for Internet based applications that contains textual data and links to separate image files. For a single HTML based page of content, a HTML file and several separate image files may be necessary. When transferring HTML based content to a different computer system the associated image files (and other files) must also be located and transferred. Locating and transferring many files for a single HTML page is burdensome and may require knowledge of all the potential image files that may be loaded by the HTML page. Unfortunately, sometimes all the associated files are not transferred resulting in HTML based content that is not fully functional.

Many Web page developers devote substantial efforts to the creation of images and associated content, such as advertising, for a professional Web page. The images are frequently copied by unscrupulous Web page developers, without a care as to Copyright violations, and reused for different uses. The associated content is discarded and the original Web page developer receives no compensation for the unauthorized use of his/her original image.

Digital camera systems exist that permit the user to annotate the content of the image file with textual information. Unfortunately, the textual information is overwritten directly on the image file thereby altering the image file itself. This permits recording of associated information with the image file but a portion of the original image content is irreversibly damaged which is unacceptable to many users. In addition, with the advent of digital cameras many users are discovering that tracking the content of digital images is becoming an increasingly difficult task. Typically the user creates additional files with information that describes the content of the digital image files. Unfortunately, when the additional files are lost the information is lost. Also, if the digital image files are misplaced, then the content in the additional file has little or no value.

One example of a file format that has been developed by a standardization organization that permits global information to be attached to images is Still Picture Interchange File Format (SPIFF), specified as an extension to the JPEG standard, ISO/IEC IS 10918-3 (Annex F). The specification was developed to permit textual information to be attached to files to facilitate searching of the files. In addition, if the textual information is voluminous then significant bandwidth may be required for transmission across a network and additional storage capability may be needed to store such files. The present inventors came to the realization that the textual information does not provide simple and accurate representations of objects within the image itself.

In view of the enhanced audio, visual, and textual experience made possible with the described invention with regard to video content, the present inventors came to the further realization that the concepts embodied in the present invention may be extended to images. In contrast to the traditional multiple file system where one file contains the textual content and the other file contains the image, or the SPIFF file format, the present inventors came to the realization that additional information that enhances the image viewing experience may be included together with the image file in a unitary file. The additional information may include audio, video, computer programs, and textual information associated with the image or objects within the image such as descriptions and locations of the objects thereof. In addition, the additional information may be used to manage the images themselves. For example, the additional information may include, for example, descriptors, histograms, and indexing information that describe the content of the image itself. With the inclusion of the additional information together with the image file itself, the additional information is not susceptible to becoming lost, misplaced, and deleted. Also, the image files may be managed based on the files themselves as opposed to a separate data file containing information regarding their content. This permits the users to select any set of image files upon which to perform searches without the necessity of having previously obtained descriptions of their content.

However, the present inventors came the realization that it is desirable to maintain compatibility with existing image presentation devices and software, such as Photoshop and Web based browsers, while permitting the enhanced functionality with modified image presentation software. To accomplish these objectives the file includes at least two layers in addition to the image itself. The image file itself remains unchanged, or substantially unchanged. The first and second layers are appended to the end of the image file and contain the additional information. In this manner existing image presentation devices and software may simply display the image file and discard the remaining information, while enhanced presentation devices and software may also use the additional appended information.

Figure 4:
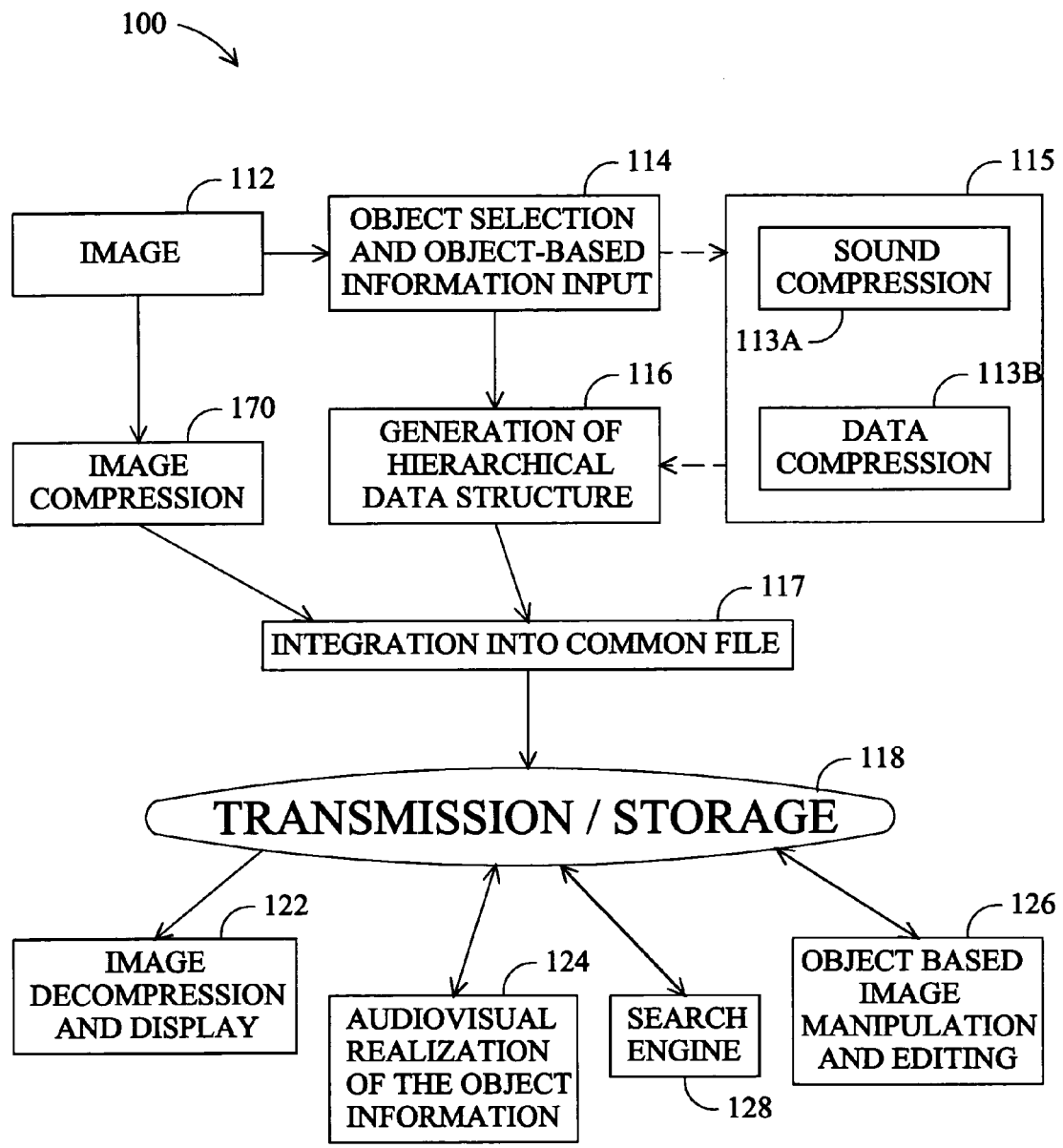
FIG. 4 is a system for creating and using an image with associated information.

Referring to FIG. 4, the preferred image system 100 includes an image 112 that is acquired or otherwise generated. The image may be acquired from any suitable source, such as, for example, an imaging device such as a camera, generated by a computer, or may be an existing image. After acquiring or otherwise selecting the image 112, an object selection 114 function may be performed interactively with the user to define regions of the image that enclose objects of interest. The regions may define any shape or region, such as a circle, ellipse, rectangle, or regular polygon. The regions may be drawn on a display using any input device, such as a pen stylus. A pen stylus is particularly useful for images obtained by a camera or presented by a computer. Alternatively, object selection of the image may be performed on a computer using image analysis software. Textual based and URL link based additional information related to particular objects within an image may be added by a user using an input device, such as a pen or keyboard. Audio annotation related to the image or objects within the image may be obtained in any suitable manner. For example, a microphone integrated or otherwise connected to the camera may allow annotation during the acquisition process. In addition, speech recognition software in the camera may be used to convert audio information to textual information using speech-to-text conversion. The speech-to-text functionality provides a convenient technique of adding textual information especially suitable for cameras that do not provide a convenient interface for entering textual based information. A compression module 115 includes an audio compression mechanism 113*a* and a data compression mechanism 113*b*. Compression of the audio annotation using a standard audio compression technique and data compression may be provided using a standard data compression technique, if desired. Suitable audio compression may include, Delta Pulse Coded Modulation (DPCM), while data compression may include Lempel-Zev-Welch (LZW).

A generation of hierarchical data structure module 116 arranges the additional information into at least two layers, with the first layer referred to as the "base layer", described later. An integration module 117 combines the content related data containing the additional information together with the image 112, compressed by a compression module 170 if desired, into a single common file. The combination of the additional information and the image file may be supported as a native part of a future image file format, such as for example, that which may be adopted by JPEG2000 or MPEG-4. Also, currently existing file formats may be extended to support the additional information. The combined file is constructed in such as manner that the extension of existing file formats provides backward compatibility in the sense that a legacy image file viewer using an existing file format may still at least decode and read the image in the same manner as if the additional information were not included therein. An implementation with separate image and information files is also within the scope of the present invention. The integrated image and additional information file is then transmitted or stored at module 118, such as a channel, a server, or over a network.

Storage may be in an type of memory device, such as a memory in an electronic camera or in a computer. The combined file containing the image and additional information may be transmitted as a single file via Email or as an attachment to an Email. If the audio and/or other associated data is compressed, decompression 122 of the audio and/or data is performed prior to audiovisual realization of the object information 124. Once images and the hierarchical data structure associated with them are available to users, they may be utilized in an interactive manner.

An interactive system utilizing the combined file may include the following steps to implement the retrieval and audiovisual realization of the object information 124 of the combined image file:

(a) retrieve and display the image data;

(b) read the base layer information;

(c) using the base layer information as an overlay generation mechanism, generate an overlay to visually indicate the regions of the image that contain additional information in terms of "hot spots," according to the region information contained in the base layer. Hot spots may be automatically highlighted or be highlighted only when a user selects a location within the region defined by the "hot spot," such as with a pointing device;

(d) display a pop-up menu adjacent, or otherwise on the display, of the object as the user points and selects the hot spots, where the types of available information for that object are featured in the menus; and (e) render the additional information selected by the user when the user selects the appropriate entry in the menu.

It is preferable that the hot spots and pop-up menus (or other presentation techniques) are invoked in response to a user's request. In this manner, the additional information provided is not intrusive, but instead supplements the image viewing experience. Steps (a)-(e) are implemented by the audiovisual realization of the object information module 124 which preferably contains appropriate computer software.

Content-based image retrieval and editing may also be supported. A search engine 128 permits the user to locate specific images based on the additional information contained within the image file. Editing is provided by an object-based image manipulation and editing subsystem 126. Images 112 may be contained in a database which contains a collection of digital images. Such an image database may also be referred to as a library, or a digital library.

Content-based information retrieval provides users with additional options to utilize and interact with the images in a dynamic nature. First the user may select one or more regions or objects of interest in an image to retrieve further information. Such information may include for example, links to related Web sites or other multimedia material, textual descriptions, voice annotations, etc. Second, the user may look for certain images in a database via search engines. In database applications, images may be indexed and retrieved on the basis of associated information describing their content. Such content-based information may be associated with images and objects within images and subsequently used in information retrieval.

Object-based image editing enables users to manipulate images in terms of the objects contained within the images. For example, the user may "drag" a human subject in a picture, "drop" it to a different background image, and therefore compose a new image with certain desired effects. The current invention allows access to an outline (contour) information of objects to enable cutting and dragging objects from one image to another where they may be seamlessly integrated with a different background. The object-based additional information related to the object is maintained with the object itself as it is moved or otherwise manipulated. Accordingly, the user need only define the outline of an object once and that outline is maintained together with the object. Preferably, the outline is a rough geometric outline that is defined in the first layer, and a more detailed outline of the object is defined in the second layer (likely containing more bytes). This two-layer structure permits more efficient transmission of images, because the more precise outline is not always necessary and is therefore only transmitted to the user upon request. Together, content-based information retrieval and object-based image editing offers a user new and exciting experience in viewing and manipulating images.

In the preferred implementation of the hierarchical data structure the "base layer" includes only content-related information and has a limited number of bytes. The actual content-related information is contained in the "second layer." The hierarchical implementation ensures that the downloading efficiency of compressed images is practically intact even after introducing the additional functionalities, while those functionalities may be fully realized when a user desires.

Two principal objects accomplished when implementing the content-based information retrieval and object-based image editing are: (1) an image file that supports such functionalities should be downloadable or otherwise transferrable across a computer system in essentially the same time and stored using essentially the same storage space as if the additional information is not included; and (2) such functionalities may be fully realized when a user or application program desires.

To accomplish the two principal objects the present inventors came to the realization that a multi-layer data structure is desired, such as two layers. The first layer, referred to herein as the "base layer", contains a limited number of bytes, such as up to a fixed number. The bytes of the first layer are principally used to specify a number of regions of interest and store a number of flags which indicate whether certain additional content-related information is available for a particular region. The second layer (and additional layers) includes the actual content-related information. In a networking application, initially only the image and the base layer of its associated content-related information are transmitted. Since the base layer contains only a limited number of bytes, its impact on the time necessary to transmitted the image is negligible.

Figure 5:
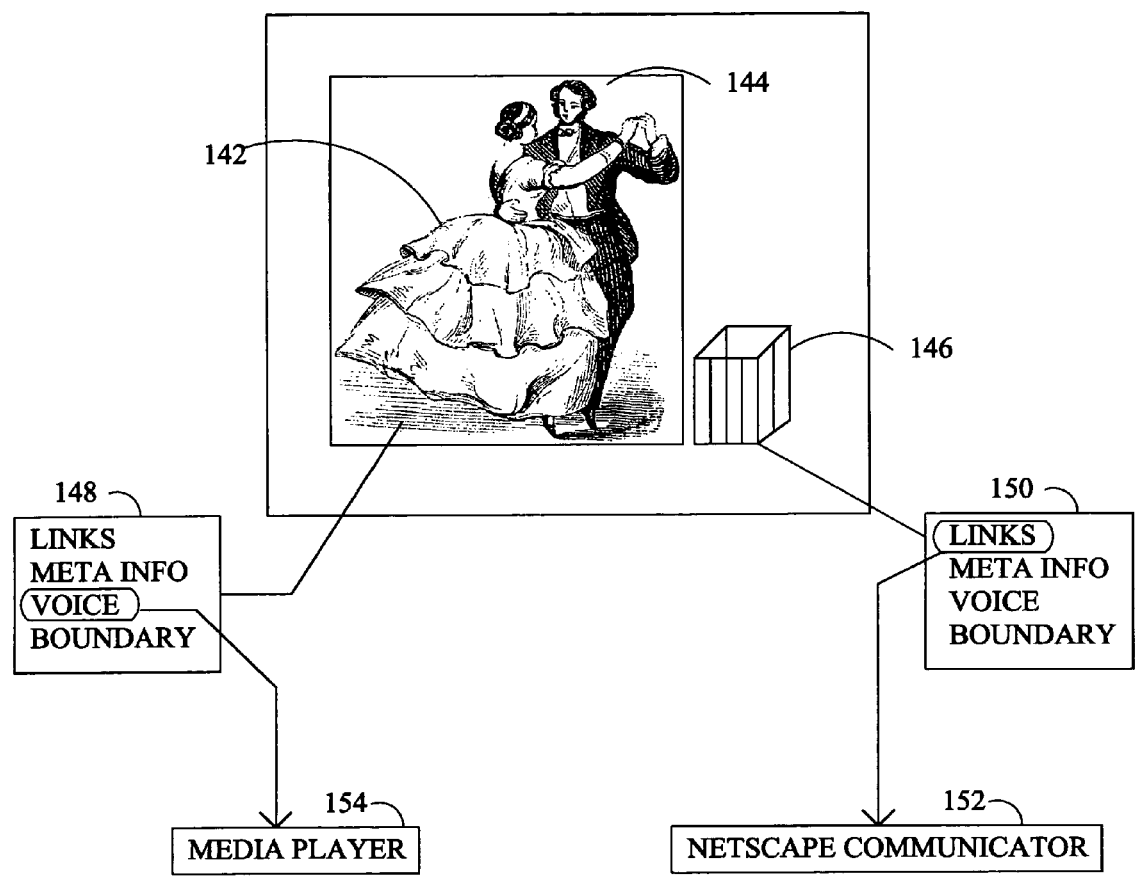
FIG. 5 is an image with associated information.

Referring to FIG. 5, after initial downloading of an image, a user may view the image 140, and may also decide to interact with the contents of the image. The interaction may include interacting with an object of interest, such as character one 142, character two 144, or an object, such as object 146. Alternatively, a region of the image may be considered as an object of interest. The entire image may also be treated as an object of interest. The user may select objects of interest using any suitable technique, such as a pointing device. The system presents a pop-up menu 148, 150 (or other presentation technique) which lists the available information related to the selected region or object, based on the flags stored in the first (base) layer. If the user selects an item from the menu, the system will then start downloading the related information stored in the second layer from the original source and provide the additional information to the user. The user may also choose to save a compressed image with or without its content-related information. When the user chooses to save the image with its content-related information, the flags corresponding to the available information in the first layer will be set to true, and vice versa.

An initial set of content-related information, which may be of common interest, includes: (1) links to computer based information; (2) meta textual information; (3) voice annotation; and (4) object boundary information. Additionally, (5) security-copyright information; and (6) references to MPEG-7 descriptors, as described in "MPEG-7: Context and Objectives (Version 4)," ISO/IEC JTC1/SC29/WG11, Coding of Moving Pictures and Audio, N1733, July 1997, may be displayed. The syntax of Table 1 may be used to support the acquisition of content-related information. Other types of content-related information may be added to this initial set as necessary to satisfy particular needs. For example, computer code, for instance written in Java language, may be added to the list of associated information. In some cases, the system will open an already running application if the application is not already running. Such applications may take any form, such as a word processing application, a Java Applet, or any other application.

TABLE 1

| Base Layer Syntax | | |
|---|---|---|
| Syntax | Bits | Mnemonic |
| num_of_regions | 6 | uimsbf |
| for (n=0; n<num_of_regions; n++){ | | |
| region_start_x | N | uimsbf |
| region_start_y | N | uimsbf |
| region_width | N | uimsbf |

TABLE 1-continued

| Base Layer Syntax | | |
|---|---|---|
| Syntax | Bits | Mnemonic |
| region_height | N | uimsbf |
| link_flag | 1 | bslbf |
| meta_flag | 1 | bslbf |
| voice_flag | 1 | bslbf |
| boundary_flag | 1 | bslbf |
| security_flag | 1 | bslbf |
| mpeg7_flag | 1 | bslbf |
| } | | | where $N=\operatorname{ceil}(\log_2 (\max(\text{image\_width}, \text{image\_height})))$.

Semantics

| | |
|---|---|
| num_of regions | The number of regions in an image which may have additional content-related information. |
| region_start_x | The x coordinate of the upper-left corner of a region. |
| region_start_y | The y coordinate of the upper-left corner of a region. |
| region_width | The width of a region. |
| region_height | The height of a region. |
| link_flag | A 1-bit flag which indicates the existence of links for a region. '1' indicates there are links attached to this region and '0' indicates none. |
| meta_flag | A 1-bit flag which indicates the existence of meta information for a region. '1' indicates there is meta information and '0' indicates none. |
| voice_flag | A 1-bit flag which indicates the existence of voice annotation for a region. '1' indicates there is voice annotation and '0' indicates none. |
| boundary_flag | A 1-bit flag which indicates the existence of accurate boundary information for a region. '1' indicates there is boundary information and '0' indicates none. |
| security_flag | A 1-bit flag which indicates the existence of security-copyright information for a region. '1' indicates there is such information and '0' indicates none. |
| mpeg7_flag | A 1-bit flag which indicates the existence of references to MPEG-7 descriptors for a region. '1' indicates there is MPEG-7 reference information and '0' indicates none. |

The syntax for the first layer requires only a limited number of bytes. For example with 256 bytes the base layer may define at least 26 regions anywhere in an image whose size may be as large as 65,536×65,536 pixels. In contrast, to define 4 regions in any image, the base layer merely requires 38 bytes.

The second layer contains the actual content-related information which, for each region, may include, for example, links, meta information, voice annotation, boundary information, security-copyright information, and MPEG-7 reference information. Other descriptions related to the image to enhance the viewing or management thereof may be included, as desired. The high-level syntax of Table 2 may be used to store the above information in the second layer.

TABLE 2

Second Layer Syntax

| Syntax | Bits | Mnemonic |
|---|---|---|
| for (n=0; n<num_of_regions; n++){ | | |
|   links( ) | | |
|   meta( ) | | |
|   voice( ) | | |
|   boundary( ) | | |
|   security( ) | | |
|   mpeg7( ) | | |
|   end_of_region | 16 | bslbf |
| } | | |

The links and meta information are textual data and require lossless coding. The voice information may be coded using one of the existing sound compression techniques such as delta pulse coded modulation (DPCM), if desired. The boundary information may utilize the shape coding techniques developed in MPEG-4 "Description of Core Experiments on Shape Coding in MPEG 4 Video," ISO/IEC JTC1/SC29/WG11, Coding of Moving Pictures and Audio, N1584, March 1997. The security-copyright information may utilize any suitable encryption technique. MPEG-7 contains reference information to additional types of links.

The precise syntax and format for each type of the above-identified content-related information may be determined during the course of file format development for future standards, and are presented herein merely as examples of the system and technique of the present invention. In general, however, the syntax structure of Table 3 may be used.

TABLE 3

Second Layer Syntax

| Syntax | Bits | Mnemonic |
|---|---|---|
| type_of_info | 8 | bslbf |
| length_of_data | 16 | uimsbf |
| data( ) | | |

Semantics

| | |
|---|---|
| links( ) | The sub-syntax for coding links. |
| meta( ) | The sub-syntax for coding meta information. |
| voice( ) | The sub-syntax for coding voice annotation. |
| boundary( ) | The sub-syntax for coding boundary information. |
| security( ) | The sub-syntax for coding security-copyright information. |
| mpeg7( ) | The sub-syntax for coding MPEG-7 reference information. |
| end_of_region | A 16-bit tag to signal the end of content-related information for a region. |
| type_of_info | An 8-bit tag to uniquely define the type of content-related information. The value of this parameter may be one of a set of numbers defined in a table which lists all types of content-related information such as links, meta information, voice annotation, boundary information, security-copyright information, and MPEG-7 reference information. |
| length_of_data | The number of bytes used for storing the content-related information. |
| data( ) | The actual syntax to code the content-related information. This may be determined on the basis of application requirements, or in accordance to the specifications of a future file format that may support the hierarchical data structure as one of its native features. |

Associating additional information, such as voice annotations and URL links to regions and/or objects in an image allows a user to interact with an image in ways not previously obtainable. Referring again to FIG. 5, an example of an image presentation with the enhanced functionality is presented. The application reads the image data as well as the base layer of information. The application then displays the image on the display and visually indicates the ("hot spots" via an overlay on the image, according to the region information in the base layer. The user selects a region and/or object of interest. A pop-up menu 148 appears which lists items that are available for the selected region and/or object (more than one may be available). When the user selects the voice annotation item, for example, the application will then locate the audio information in the second layer and play it back using a default sound player application 154. If the user selects a link which is a URL link 150 to a Web site 152, the system will then locate the address and display the corresponding Web page in a default Web browser. A link may also point to another image file or even point to another region and/or object in an image. Similarly, additional meta information may also be retrieved and viewed (in a variety of different formats) by the user by selecting the corresponding item in the menu. Using this technique, different regions and/or objects in the same image may have different additional information attached thereto. The user is able to hear different voices corresponding to different characters in the image, for instance. Individual Web pages (or other associated information obtained via a computer network) may also be attached directly to more relevant components in the scene.

Figure 6:
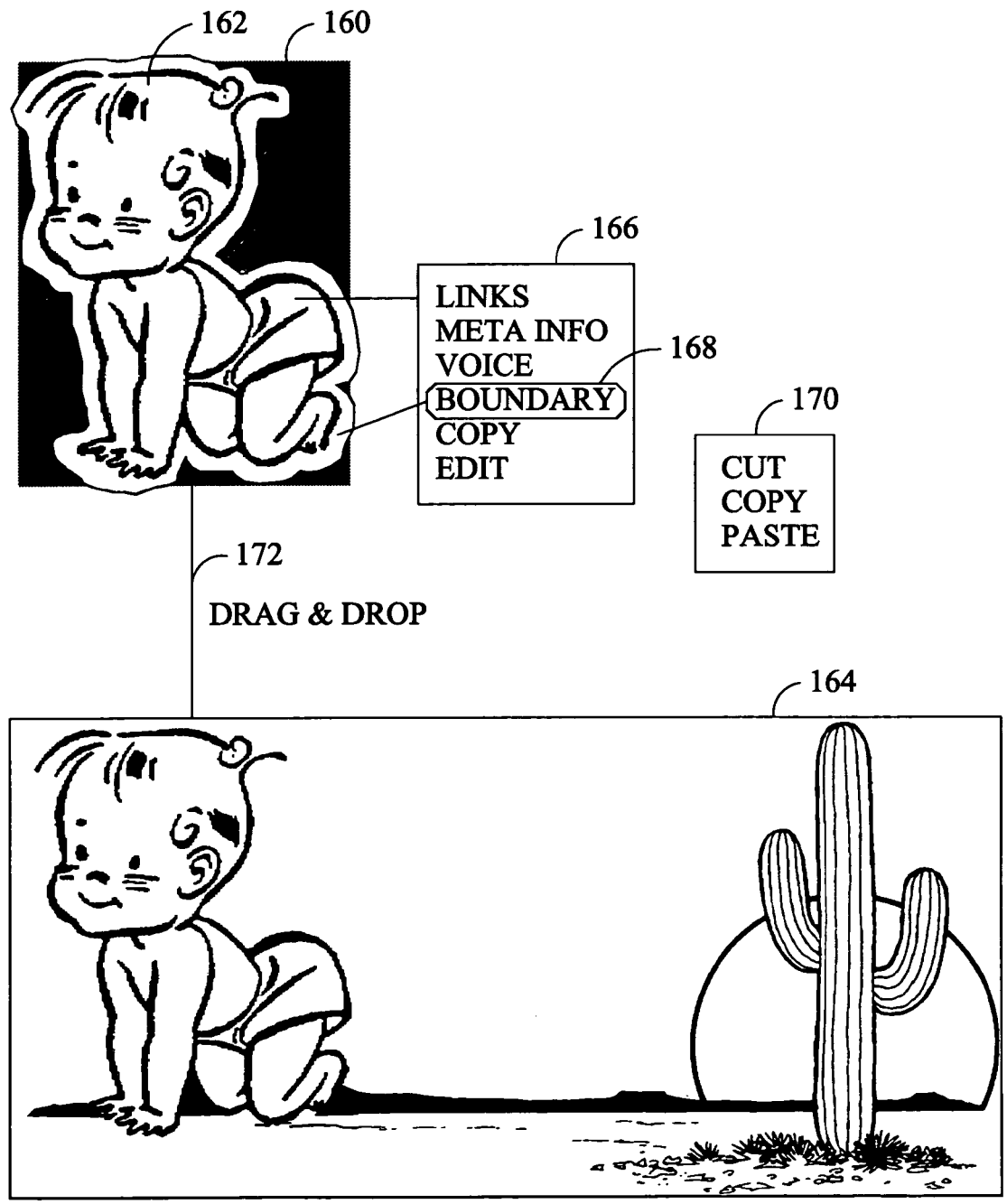
FIG. 6 illustrates the movement of an image and associated information from one image to another image.

When editing images it is desirable to cut, copy, and paste in terms of objects having arbitrary shapes. The proposed technique supports such functionality provided additional shape information is available in the file. Referring to FIG. 6, an example whereby using the boundary information 160 associated with a baby object 162, a user may copy the baby object 162, and place it into a different background 164, thus, moving one computer-generated image into another computer-generated image. In addition, the attributes related to the baby object 162 are maintained, such as audio. The sequence of actions may happen in the following order. The user first selects the baby object 162 and the system provides a pop-up menu 166. The user then selects the boundary item 168, which is generated by a boundary generation mechanism in the system. The system then loads the boundary information from level 2 and highlights the baby object, as indicated by the bright line about the object. The user may then cut and paste 170 (or otherwise relocate) or perform a drag and drop type 172 of action from the edit menu 170 (copy).

By associating descriptors to images, such as MPEG-7 descriptors, the images may be retrieved based on their audio and/or visual contents by advanced search engines. The descriptors may include color, texture, shape, as well as keywords. In general, an image only needs to carry minimal reference information which points to other description streams, such as an MPEG-7 description streams.

An integrated system to support the advanced functionality of content-based information retrieval and object-based image editing has been disclosed. The technique employs a two-layer (or more) hierarchical data structure to store the content-related information. The first layer includes coordinates which specify regions of interest in rectangular shape and flags which indicate whether certain additional content-related information is available for the specified regions. The actual content-related information is stored in the second layer where one may find, for example, links, meta information, audio annotation, boundary information, security-copyright information, and MPEG-7 reference information for each specified object and/or region.

With the first layer having a limited number of bytes, the downloading time necessary to obtain the file and storage necessary for the image and first layer is minimized, unless the user or application explicitly requests additional content-related information from the second (or additional layer). On the other hand, should the user require such information, the proposed technique also guarantees it may be fully delivered by the file itself containing the remaining information.

The existing JPEG compressed image file formats, such as still picture interchange file format (SPIFF) or JPEG File Interchange Format (JFIF), do not inherently support object-based information embedding and interactive retrieval of such information. Although creating, experiencing, and utilizing information enhanced images may be performed using the system of the current invention, it may be also desirable that the information enhanced images created by the current invention may be at least decoded and displayed by legacy viewers using any standard format, such as JFIF or SPIFF. Indeed, the legacy systems will not be able to recognize and utilize the associated information. The goal for this aspect of the present invention is therefore to guarantee successful image decoding and display by a legacy system without breaking down the legacy system.

If backward compatibility with legacy viewers, such as those that utilize JFIF and SPIFF file formats, is a necessity, the disclosed hierarchical data structure may be encapsulated into a JIFF or SPIFF file format. Examples of such encapsulations that may be implemented by module 117 in FIG. 4 are given below.

Figure 7:
FIG. 7 is an image file format for the system of FIG. 4.

JIFF file format is described in Graphics File Formats: Second Edition, by J. D. Murray and W. VanRyper, O'Reilly & Associates Inc., 1996, pp. 510-515. Referring now to FIG. 7, a JFIF file structure 190 contains JPEG data 192 and an End Of Image (EOI) marker 194. A JFIF viewer simply ignores any data that follows the EOI marker 194. Hence, if the 2-layer hierarchical data structure 196 disclosed herein is appended to a JFIF file immediately after EOI 194, the legacy viewers will be able to decode and display the image, ignoring the additional data structure. A system constructed according to the present invention may appropriately interpret the additional data and implement the interactive functionalities of the invention.

Using SPIFF, the hierarchical data structure may be encapsulated using a private tag, known to the system of the present invention. Since a legacy viewer will ignore non-standard tags and associated information fields, according to the SPIFF specification, images may be successfully decoded and displayed by SPIFF-compliant legacy systems. The system of the present invention recognizes and appropriately utilizes the added data to enable its interactive functionalities. SPIFF is described in *Graphics File Formats: Second Edition*, by J. D. Murray and W. VanRyper, O'Reilly & Associates Inc., 1996, pp. 822-837.)

The method may be applied to any existing computing environment. If an image file is stored on a local disk, the proposed functionalities may be realized by a stand-alone image viewer or any application which supports such functionalities, without any additional system changes. If the image file is stored remotely on a server, the proposed functionalities may still be realized by any application which support such functionalities on the client side, including an image parser module on the server. The server includes an image parser because the additional content-related information resides in the same file as the image itself. When a user requests certain content-related information regarding a selected region and/or object in an image, e.g., its meta information, it is important that the system fetches only the relevant information and presents it to the user, preferably as fast as possible. To achieve this objective, the server parses the image file, locates, and transmits relevant content-related information to the client.

Figure 8:
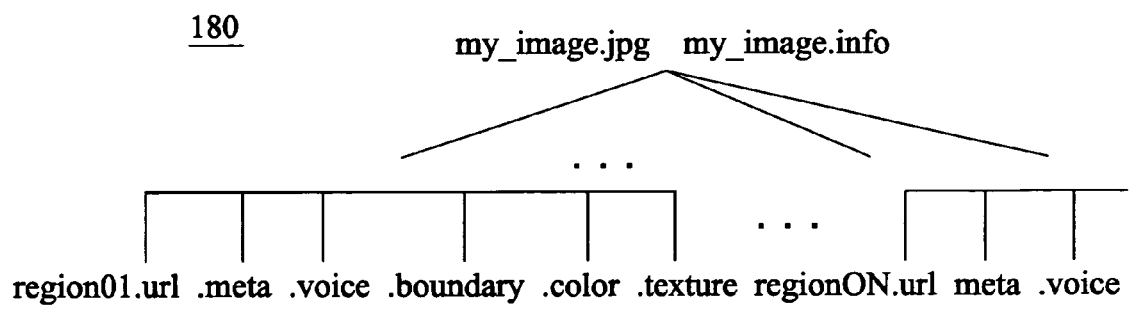
FIG. 8 illustrates an alternative image file structure.

To implement the aforementioned additional functionality without the enhancement of the present invention, each piece of content-related information is stored in a separate file, as shown in FIG. 8, generally at 180. Therefore, for each defined region, as many as six files which contain links, meta information, voice annotation, boundary information, security-copyright information, and MPEG-7 reference information may be required. For a given image, say my_image.jpg, a directory called my_image.info which contains content-related information for N defined regions is created and stored in:

region01.links region01.meta region01.voice region01.boundary region01.security region01.mpeg7

***** region0N.links region0N.meta region0N.voice region0N.boundary region0N.security region0N.mpeg7

Using separate files to store additional information is fragile and messy in practice. A simple mis-match between the file names due to a name change would cause the complete loss of the content-related information.

The present invention has several advantages over the known prior art, such as, for example: (1) it is object-based and thus flexible; (2) it allows for inclusion of object feature information, such as object shape boundary; (3) is has a hierarchical data structure and hence it does not burden those applications that choose not to download and store image-content related information; (4) it allows audiovisual realization of object-based information, at users' request; (5) it allows for inclusion of URL links and hence provides an added dimensionality to enjoyment and utilization of digital images (The URL links may point to web pages related to the image content, such as personal web pages, product web pages, and web pages for certain cities, locations, etc.); and (6) it is generic and applicable to any image compression technique as well as to uncompressed images. The present invention also provides object-based functionalities to forthcoming compression standards, such as JPEG 2000. Although prior file formats do not inherently support the system disclosed herein, techniques for implementing the system in a backward compatible manner where legacy systems may at least decode the image data and ignore the added information has been disclosed.

Data structures configured in the manner described in the present invention may be downloaded over a network in a selective fashion. The downloading application checks with the user interactively to determine whether the user desires to download and store the content information. If the user says "No," the application retrieves only the image data, the base layer, and sets the flags in the base layer to zero indicating that there is no content information with the image.

The method and system also support scalable image compression/decompression algorithms. In quality-scalable compression, images may be decoded at various different quality levels. In spatial scalable compression, the image may be decoded at different spatial resolutions. In case of compression algorithms that support scalability, only the region information and object contour needs to be scaled to support spatial scalability. All other types of data stay intact.

Figure 10:
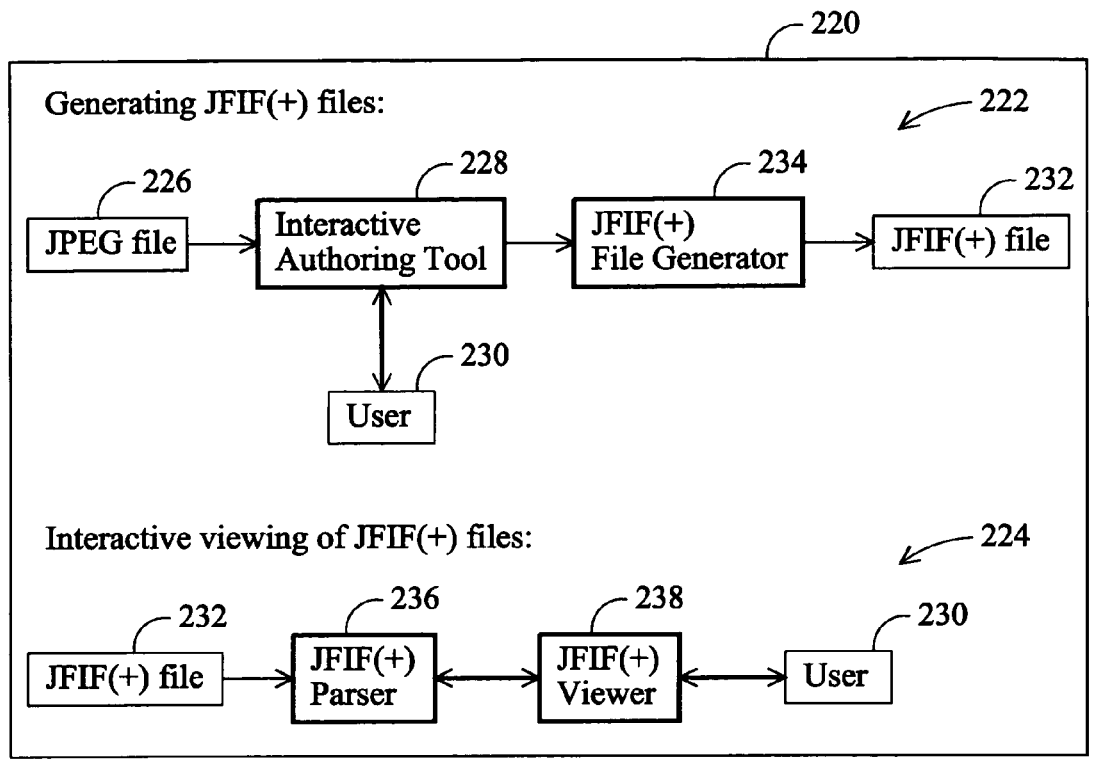
FIG. 10 illustrates a JFIF(+) creator and viewer.
Figure 11:
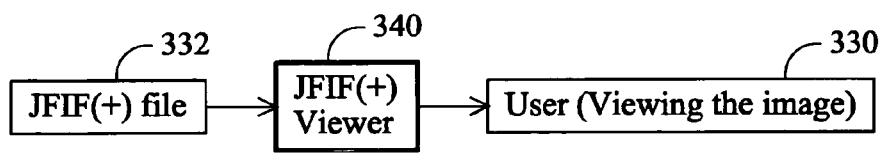
FIG. 11 illustrates viewing a JFIF(+) image on a legacy viewer.

JPEG compressed images are commonly formatted as a JPEG file interchange format (JFIF). The present inventors further determined that JFIF may be extended resulting in a new file format where object based information embedding is enabled using the two-layer (or more) data structure. The resulting extended file format is referred to as JFIF(+). A preferred system for generating and viewing JFIF(+) files is depicted in FIG. 10. JFIF(+) is viewable with legacy JPEG/JFIF viewers. FIG. 11 depicts the backward compatibility of JFIF(+) with legacy JPEG viewers.

Figure 9:
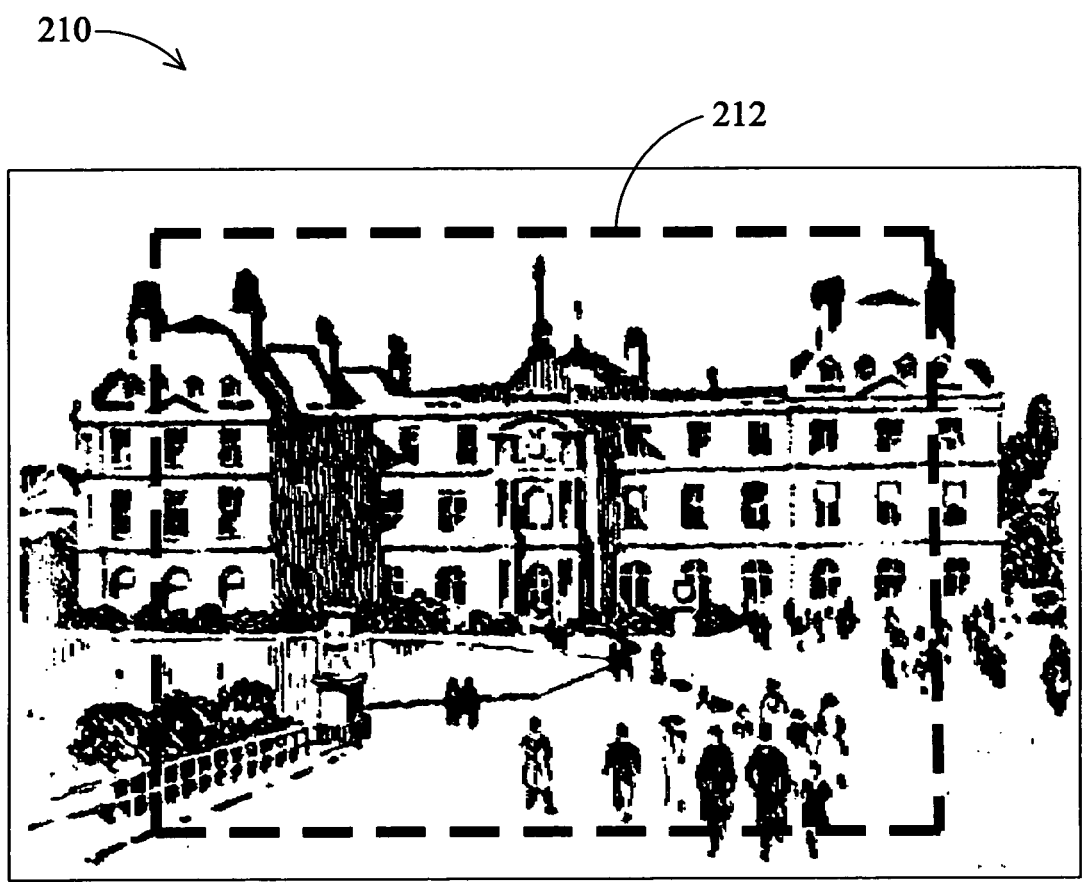
FIG. 9 illustrates an image with cropping information.

The present inventors come to the realization that additional information types, such as JPL_FINISHINFO, are useful for containing information and instructions to a photo finisher (including, for example, cropping, paper types and settings), especially useful, for example, for on-line ordering of prints. A particular example of this application is depicted in FIG. 9. JFIF(+) includes a provision for storing digital ink information, and information about user's viewing patterns of images (e.g., frequency of viewing, etc.). The history allows the system to develop user preferences and a data base to provide appropriate images upon request. Also, this alleviates a "page zero" dilemma by being able to provide images from a data base without the viewer having viewed any of them by the user preferences. An application of JFIF(+) is enhanced image EMail where personalized audiovisual information may be embedded for different objects in the picture and then played back by the receiver.

JFIF(+) is an extension to the already established JFIF file format. JFIF(+) adds support for node based image outline objects and the linking of these objects to various other data types such as, URLs, sound files, executables, textual descriptions and custom application defined data. This additional information may be used to create an interactive environment, offer advanced object based editing functions, and to retrieve information based on content.

The original JFIF format allows for only a limited number of application extensible markers, each of a limited size. The JFIF(+) information of the present invention is added to the end of the JFIF file. This file structure offers flexibility and maintains compatibility with standard JFIF decoders.

The additional information in the JFIF(+) format is divided into two layers (or more), a first layer (Layer 1), containing basic information necessary to render the JFIF(+) interface and, a second layer (Layer 2), containing the actual information linked to the objects in the image. By dividing the data into these two layers (or more) it is possible for low bandwidth devices to download only the small first layer and then, based on user feedback, download the additional data that the user requests. When the server lacks the capability to provide such interaction, the entire file may be loaded.

TABLE 4

File Organization

JFIF Data

| JFIF(+) | First Layer |
| JFIF(+) | Second Layer |

The JFIF(+) information follows the EOI marker specified in the standard JFIF format. This requires a partial parsing of the original JFIF file in order to find the EOI marker. The first layer of the JFIF(+) information identifies the additional information as JFIF(+) data and contains a minimum of information about the defined objects. This information includes a rectangular region (or other definition) defining the object's position in the image and an identifier defining the type of data contained in the object.

TABLE 5

First Layer

| Item | Size | Description |
| --- | --- | --- |
| identifier | 16 bits | A unique value to identify a JFIF+ file. Always contains $D0, $07. |
| version | 8 bits(uimbsf) | Version of this JFIF+ file. Contains 0.01 for this version of JFIF(+). |
| length | 32 bits(uimbsf) | The total length of the first layer information (including identifier). |
| numOfObjects | 16 bits(uimsbf) | The number of objects in the JFIF(+) information. |
| for(i=0;i<numOfObjects;i++){ | | |
| numOfData | 16 bits(uimsbf) | Number of data items associated with this object. |
| x | 16 bits(uimsbf) | X starting position of object's rectangular region (set to 0 for data items that are not associated with a specific region). |
| y | | Y starting position of object's rectangular region (set to 0 for data items that are not associated with a specific region). |
| | 16 bits(uimsbf) | |
| width | 16 bits(uimsbf) | Width of object's rectangular region (set to 0 for data items that are not associated with a specific region). |
| height | 16 bits(uimsbf) | Height of object's rectangular region (set to 0 for data items that are not associated with a specific region). |
| ID | NumOfData*16 bits(uimsbf) | Array of type identifiers for the data objects associated with the region(Type information to follow). |
| } | | |

Table 5, in essence, defines the regions of the image that may contain additional data. The identifier field permits the system to identify the file as a JFIF(+) file. The length field signals the length of the first layer so it is easily separated from layer 2.

The second layer of the JFIF(+) structure contains the data associated with the objects defined in the first layer in the order that they were defined.

TABLE 6

Format of Second Layer

| Item | Size | Description |
| --- | --- | --- |
| length | 32 bits(uimsbf) | Total length of the second layer. |
| offsetArray [n] | numOfData*32 bits(uimbsf) | Array of offsets from the end of the header to the start of each data item. |
| data | | Start of object data. |

TABLE 7

Defined Data Types

| Type | Value | Description |
| --- | --- | --- |
| JPL_BOUNDARY | 1 | Detailed boundary information for the object(format follows). |
| JPL_META | 2 | Meta tags as defined for HTML. Content creators may either add many individual META tags or add one set of text containing many META tags. |
| JPL_AIFF_SOUND | 3 | AIFF format sound data. |
| JPL_URL | 4 | URL text. |
| JPL_TEXT | 5 | Text annotation(It is recommended that text falling into one of the predefined META tag definitions be entered in a META field). |
| JPL_HTML | 6 | HTML page to be rendered within the object(If the parser supports META tags, it should also look here for META information). |
| JPL_JAVA | 7 | A Java Applet (When including any executable, requirements information should be included in a JAVAREQ). |
| JPL_JAVAREQ | 8 | A null terminated test string containing information for the user concerning the executable's requirements. |
| JPL_HISTOGRAM | 9 | Color histogram information (format follows). |
| JPL_ENVINFO | 10 | A data structure containing information about the conditions under which the image was created. |
| JPL_FINISHINFO | 11 | A data structure containing information for a photo finisher to use in reproducing the image. |
| JPL_DATE | 12 | ISO C 26 Character Format null terminated string containing the date of creation. |
| JPL_EDITDATE | 13 | ISO C 26 Character Format null terminated string containing last date edited. |
| JPL_SPRITE | 14 | A JFIF image to be drawn on top of the main image at the object's location. |
| JPL_AUTHOR | 15 | A null terminated string containing author information. |
| JPL_COPYRIGHT | 16 | A null terminated string containing copyright information. |
| JPL_PROTECTED | 17 | A structure containing password protected encrypted data. |
| JPL_INK | 18 | A digital ink structure to be drawn on top of the main image at the object's location. |
| JPL_USEINFO | 20 | A structure containing information about how the image has to be viewed. |
| JPL_RESERVED | ~1999 | Reserved for further extension. |
| JPL_USER | 2000-65535 | For proprietary use by software vendors. |

TABLE 8

JPL_BOUNDARY Data Format

| Item | Size | Description |
| --- | --- | --- |
| NumOfVerticies | 16 bits(uimsbf) | The total number of vertices in the boundary representation. |
| x | 16 bits(uimsbf) | x position of starting vertex. |
| y | 16 bits(uimsbf) | y position of starting vertex. |
| for(i=0;i<numOfObjects;i++){ | | |
| dx[n] | 8 bits(uimsbf) | x offset from previous vertex. |
| dy[n] | 8 bits (uimsbf) | y offset from previous vertex. |
| } | | |

TABLE 9

JPL_HISTOGRAM Format

| Item | Size | Description |
| --- | --- | --- |
| colorSpaceID | 8 bits(uimsbf) | The color space identification code e.g., RGB, HSV, etc. |
| uSize | 8 bits(uimsbf) | The number of bins along the first color axis, e.g., R |
| vSize | 8 bits(uimsbf) | The number of bins along the first color axis, e.g., G |
| wSize | 8 bits(uimsbf) | The number of bins along the first color axis, e.g., B |
| for(u=0;u<uSize; u++){ | | |
| for(v=0;v<vSize; v++){ | | |
| for(w=0;w<wSize; w++){ | | |
| count[u][v][w] | 8 bits(uimsbf) | The total number of pixels in the image which are in color(u, v, w) |
| } | | |
| } | | |
| } | | |

TABLE 10

JPL_ENVINFO Format

| Item | Size | Description |
| --- | --- | --- |
| cameraID | strlen+1 | A text string containing the camera's ID. |
| flashMode | 8 bits(uimsbf) | 0-off, 1-on, other values are camera specific. |
| shutterSpeed | 32 bits(uimsbf) | Shutter speed in nanoseconds. |
| fStop | 8 bits (uimsbf) | Fstop setting. |
| indoor | 8 bits (uimsbf) | 0-indoor, 1-outdoor, other values are camera specific. |
| focalLength | 16 bits(uimsbf) | Focal length of lens in millimeters. |

TABLE 11

JPL_FINISHINFO Format

| Item | Size | Description |
| --- | --- | --- |
| paperSize | 8 bits(uimsbf) | The paper size. |
| paperType | 8 bits(uimsbf) | The paper type (glossy, matte, etc.). |
| printEffect | 8 bits(uimsbf) | The print effect (oil paint, impressionist, etc.) |
| cropX | 16 bits(uimsbf) | Crop and zoom x position. |
| cropY | 16 bits(uimsbf) | Crop and zoom y position. |
| cropW | 16 bits(uimsbf) | Crop and zoom width. |
| cropH | 16 bits(uimsbf) | Crop and zoom height. |

TABLE 12

JPL_PROTECTED Format

| Item | Size | Description |
| --- | --- | --- |
| passwordKey | strlen+1 | The encryption key for the data. |
| ID | 16 bits(uimsbf) | The type identifier for the data object associated with the region. |
| data | | Start of encrypted object data. |

TABLE 13

JPL_FINISHINFO Format

| Item | Size | Description |
| --- | --- | --- |
| times | 16 bits(uimsbf) | The number of times an image has been viewed (no roll over). |
| time | 32 bits(uimsbf) | The number of seconds an image has been viewed (no roll over). |
| width | 16 bits(uimsbf) | The width at which the image was viewed. |
| height | 16 bits(uimsbf) | The height at which the image was viewed. |
| date | strlen+1 | ISO C 26 Character Format null terminated string containing the last date the photo was viewed. |
| linkNext | strlen+1 | Full path and name of the next image viewed. |
| linkPrev | strlen+1 | Full path and name of the previous image viewed. |

It is noted that information other than the types of information discussed herein may be incorporated into a JFIF(+) framework. In addition, data formats for the types of information described herein may be expanded to include more details. A design similar to JFIF(+) may also be made for images that are compressed by techniques other than JPEG.

Referring now to FIG. 9, an image 210 illustrates a possible application of the disclosed image file format. This particular application is on-line ordering of a high-quality output print of a digital image. The proposed file format provides additional flexibility in ordering prints on line. The user may specify a region 212, surrounded by dashed lines, to be zoomed, cropped, and printed. Referring now to FIG. 10, the technique depicted generally at 220 includes a method for generating JFIF(+) files 222, and a method for viewing JFIF (+) files 224. Generating JFIF(+) files 222 starts with a JPEG file 226. Using an authoring tool 228, a user 230 draws a rectangular region 212 on image 210, and then inputs information that is stored in the JPL_FINISHINFO field in order to provide printing instructions to the photo finisher. The authoring application automatically reads the coordinate and size information of the region and places them in the JPL_FINISHINFO field. The user then transfers the resulting file 232, generated by a JFIF(+) file generator 234, to a service provider. The service provider uses a reader application 224, which contains a JFIF(+) parser 236, extracts the cropping and printing instructions, and executes the order. The result may be viewed in a JFIF(+) viewer 238, also referred to herein as an enhanced JFIF interface. In this example, the first layer of the file contains the position information for the region of interest and the second layer contains the region specific information.

An enhanced JFIF interface allows the user to identify the image objects that contain information and discover the types of information using the basic information contained in the first layer. Through the enhanced JFIF interface the user can access particular information, contained in layer 2, linked to a particular object.

Alternatively, the JPL_FINISHINFO field may not be used. The user, for instance, may attach textual information to the specified region by invoking the JPL_TEXT. The textual information may state "zoom and crop this region and make two prints; one 4×6 and one 5×7 both printed on matte paper." In yet another variation, the user may choose to express the order description via voice input by invoking the sound field.

FIG. 11 depicts how a JFIF(+) file 332 may be input to a JPEG/JFIF legacy viewer 340, which will display the conventional portion of the image to user 330. The added features of the JFIF(+) file will not be available to the user of the legacy viewer, but the basic image will still be usable.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of associating additional information with a video including a plurality of frames comprising:
    (a) identifying at least one of said frames representative of a picture composed of a plurality of pixels;
    (b) providing a descriptive stream separate from said video;
    (c) including said additional information in said descriptive stream related to said at least one of said frames;
    (d) providing said video for displaying on a display;
    (e) selectively providing said additional information to a viewer approximately the time of said providing said video where said additional information is an object depicted by said picture by said pixels;
    (f) wherein said additional information includes executable computer program code.

2. The method of claim 1 wherein said additional information includes at least one of an object index, a textual description, a voice annotation, an image feature, an object link, a URL link, and a Java applet.

3. The method of claim 1 wherein said identifying is an object within said frame.

4. A method of claim 3 wherein said additional information is related to said object.

5. The method of claim 4 wherein said additional information includes textual based information related to said object.

6. The method of claim 4 wherein said additional information includes audible information related to said object.

7. The method of claim 4 wherein said additional information includes image features comprising at least one of texture, shape, dominant color, and a motion model related to said object.

8. The method of claim 4 wherein said additional information includes links to at least one of other objects and frames within said video.

9. The method of claim 4 wherein said additional information includes program instructions related to said object.

10. The method of claim 1 where said descriptive stream is related to a plurality of said frames.

11. The method of claim 10 wherein said at least one of said frames are in sequential order in said video.

12. The method of claim 10 wherein said at least one of said frames are in nonsequential order in said video.

13. The method of claim 1 wherein said descriptive stream includes an index synchronizing said video with said descriptive stream.

14. The method of claim 1 wherein said descriptive stream is encoded separately from said video.

15. The method of claim 14 wherein said video is decoded in the same manner independently of whether said descriptive stream is provided.

16. The method of claim 15 wherein said video is at least one of MPEG-2 and television broadcast format.

17. The method of claim 1 wherein said additional information is presented to said viewer on a remote control.

18. The method of claim 1 wherein an audible signal indicates the availability of said additional information.

19. The method of claim 1 wherein a visual signal indicates the availability of said additional information.

20. A video system comprising:
(a) an encoder that includes additional information within a video stream including a video including a plurality of frames representative of a picture composed of a plurality of pixels, where said additional information is related to at least one of said frames;
(b) a receiver that receives said video and said additional information, and said receiver decodes said video in the same manner independently of whether said additional information is provided;
(c) a display for displaying said video;
(d) a trigger mechanism for selectively presenting said additional information to a viewer at approximately the time of presenting said frames to said viewer where said additional information is an object depicted by said picture by said pixels;
(e) wherein said additional information includes executable computer program code.

21. The system of claim 20, further comprising:
(a) a transmitter for transmitting said video signal and said additional information; and
(b) a receiver for receiving said video signal and said additional information.

22. The system of claim 21 wherein said encoder is at least one of a video camera and a computer.

23. The system of claim 20 wherein said trigger mechanism is located in a remote control device.

24. The system of claim 20 wherein said additional information is provided by a remote control device.

25. The method of claim 20 wherein said additional information is related to an object within said frame and includes links to at least one of other objects and frames within said video.

26. The method of claim 20 wherein said additional information is related to an object within said frame and includes program instructions related to said object.

27. The method of claim 20 wherein said additional information is related to an object within said frame and includes textual based information related to said object.

28. The method of claim 20 wherein said additional information is related to an object within said frame and includes audible information related to said object.

29. The method of claim 20 wherein said additional information is related to an object within said frame and includes image features comprising at least one of texture, shape, dominant color, and a motion model related to said object.

* * * * *